US008158270B2

(12) United States Patent
Ogata et al.

(10) Patent No.: US 8,158,270 B2
(45) Date of Patent: Apr. 17, 2012

(54) TITANIA-METAL COMPOSITE AND METHOD FOR PREPARATION THEREOF, AND FILM FORMING METHOD USING DISPERSION COMPRISING THE COMPOSITE

(75) Inventors: Shiro Ogata, Tokyo (JP); Yoshimitsu Matsui, Saga (JP)

(73) Assignee: Sustainable Titania Technology Incorporated, Tokyo (JP)

( * ) Notice: Subject to any disclaimer, the term of this patent is extended or adjusted under 35 U.S.C. 154(b) by 0 days.

(21) Appl. No.: 13/216,568

(22) Filed: Aug. 24, 2011

(65) Prior Publication Data

US 2012/0045655 A1 Feb. 23, 2012

Related U.S. Application Data

(62) Division of application No. 10/533,823, filed as application No. PCT/JP03/14053 on Nov. 4, 2003, now Pat. No. 8,025,976.

(30) Foreign Application Priority Data

Nov. 7, 2002 (JP) ................................ 2002-323831

(51) Int. Cl.
 *C01G 23/04* (2006.01)
 *C09D 1/00* (2006.01)
 *C09D 5/16* (2006.01)
 *C09C 1/36* (2006.01)
 *B05D 1/00* (2006.01)
(52) U.S. Cl. ........ 428/472; 428/702; 106/436; 106/437; 106/439; 106/440; 106/443; 106/13; 106/287.19; 427/180; 252/70; 252/194

(58) Field of Classification Search .................. None
See application file for complete search history.

(56) References Cited

U.S. PATENT DOCUMENTS

| 5,451,252 A | 9/1995 | Elfenthal et al. |
| 5,935,717 A | 8/1999 | Oishi et al. |
| 6,099,969 A | 8/2000 | Ogata |

(Continued)

FOREIGN PATENT DOCUMENTS

DE 25 45 243 A1 4/1977

(Continued)

OTHER PUBLICATIONS

Product page identifying CR-90 as treated Rutile Titanium Oxide, Ishihara Sangyo Kaisha, Ltd., Http://www.isk.web.co.jp, obtained Jan. 2, 2009, 2 pages.

(Continued)

*Primary Examiner* — Aaron Austin
(74) *Attorney, Agent, or Firm* — Fay Sharpe LLP

(57) ABSTRACT

Under the presence of at least one out of copper, manganese, nickel, cobalt, iron, zinc, and compounds thereof, a tetravalent titanium salt solution and a basic solution are reacted together to form a hydroxide of titanium and the above metal, and then the titanium hydroxide is peroxidated with an oxidizing agent to manufacture an aqueous liquid or dispersion having therein titanium oxide fine particles having peroxy groups; by using this alone to form a coating film adjacent to a coating film of an organic dye or pigment, or using this to form a coating film together with an organic dye or pigment, a drop in decorativeness of color due to fading or discoloration of a coating material, a printed article, a building material, a fiber, an organic polymer resin product or the like can be prevented, and moreover surface anti-soiling and hydrophilic properties can be realized.

3 Claims, 8 Drawing Sheets

U.S. PATENT DOCUMENTS

| | | |
|---|---|---|
| 6,277,346 B1 | 8/2001 | Murasawa et al. |
| 2001/0046937 A1 | 11/2001 | Murasawa et al. |

FOREIGN PATENT DOCUMENTS

| | | |
|---|---|---|
| EP | 0 924 164 A2 | 6/1999 |
| JP | 10-067516 | 3/1998 |
| JP | 10-259320 A | 9/1998 |
| JP | 11-286619 A | 10/1999 |
| JP | 2002-212463 A | 7/2002 |
| SU | 1640136 A1 | 5/1988 |
| WO | WO 00/18686 | 4/2000 |
| WO | WO 00/46153 | 8/2000 |

OTHER PUBLICATIONS

International Search Report of International Application No. PCT/JP03/14053 dated Feb. 17, 2004 (4 pages).

[FIG. 1]
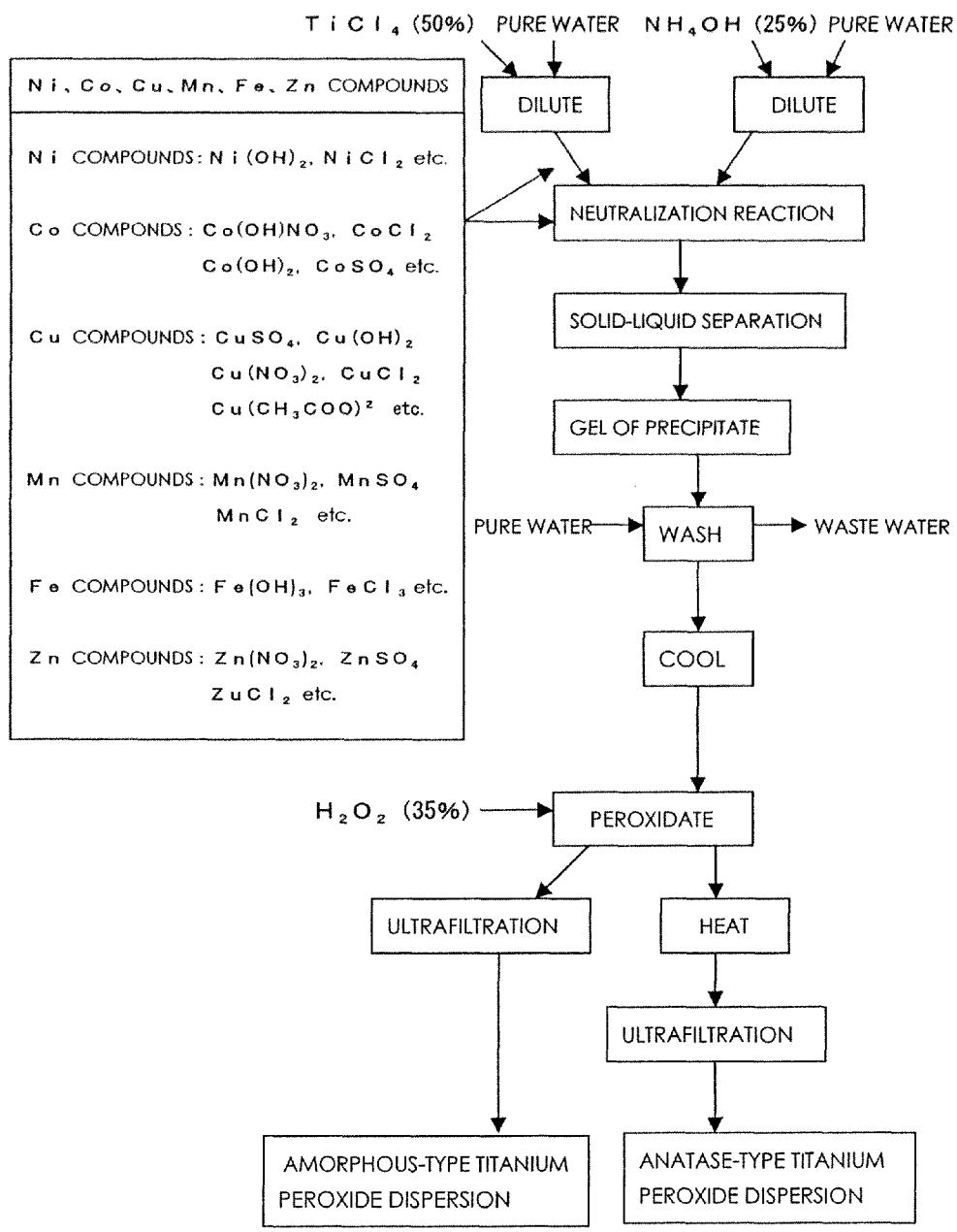

[FIG. 2]
A 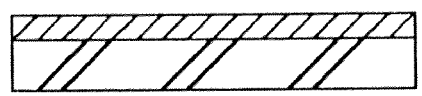 BUILD UP LAYER ON SUBSTRATE
B 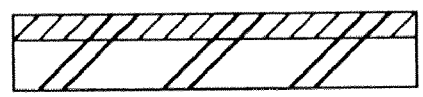 PERMEATE INTO SUBSTRATE SURFACE
C 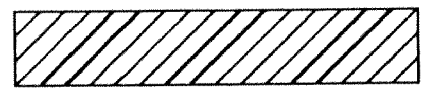 MIX INTO SUBSTRATE

[FIG. 3]
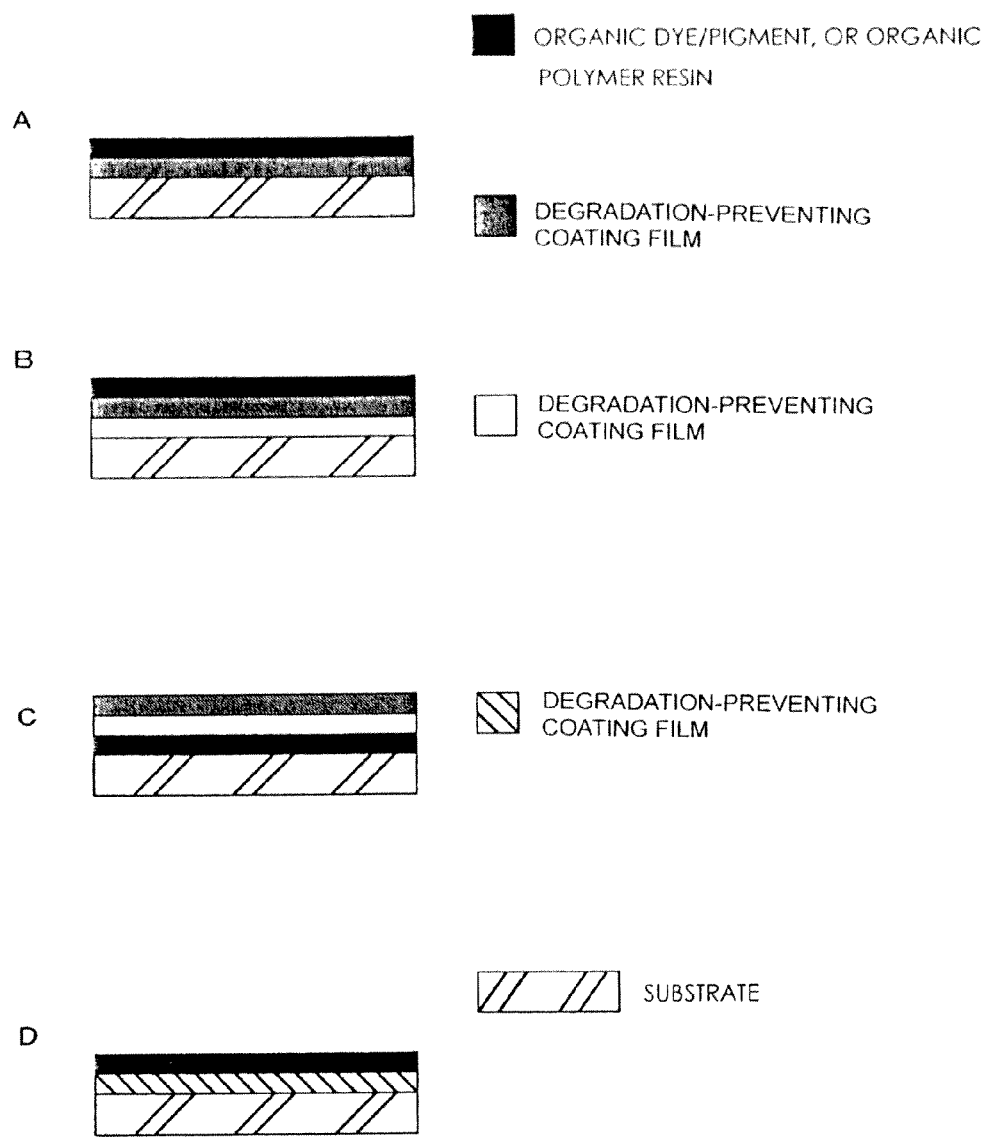

[FIG. 4]
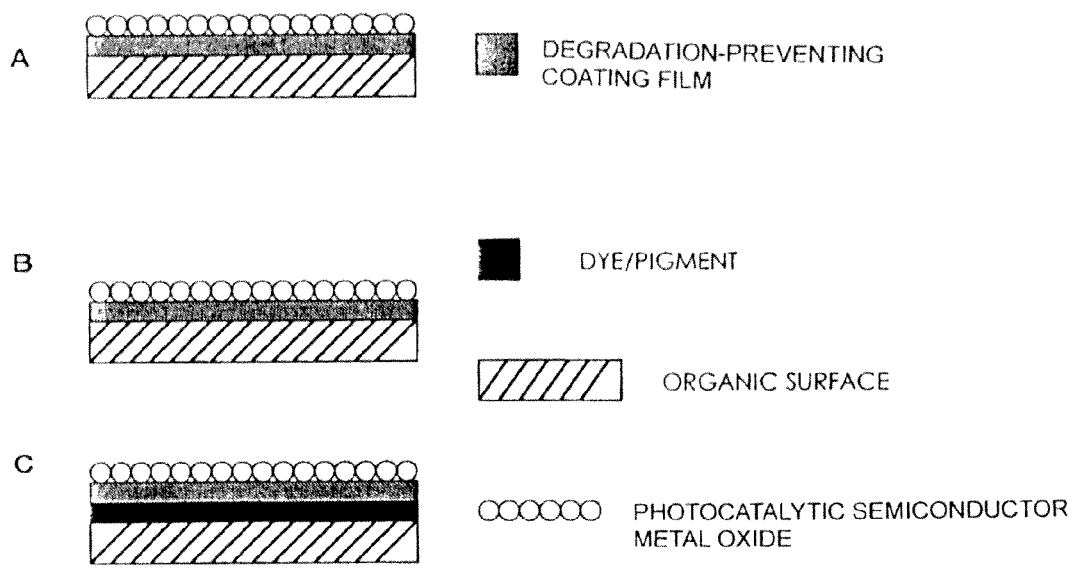

[FIG. 5]
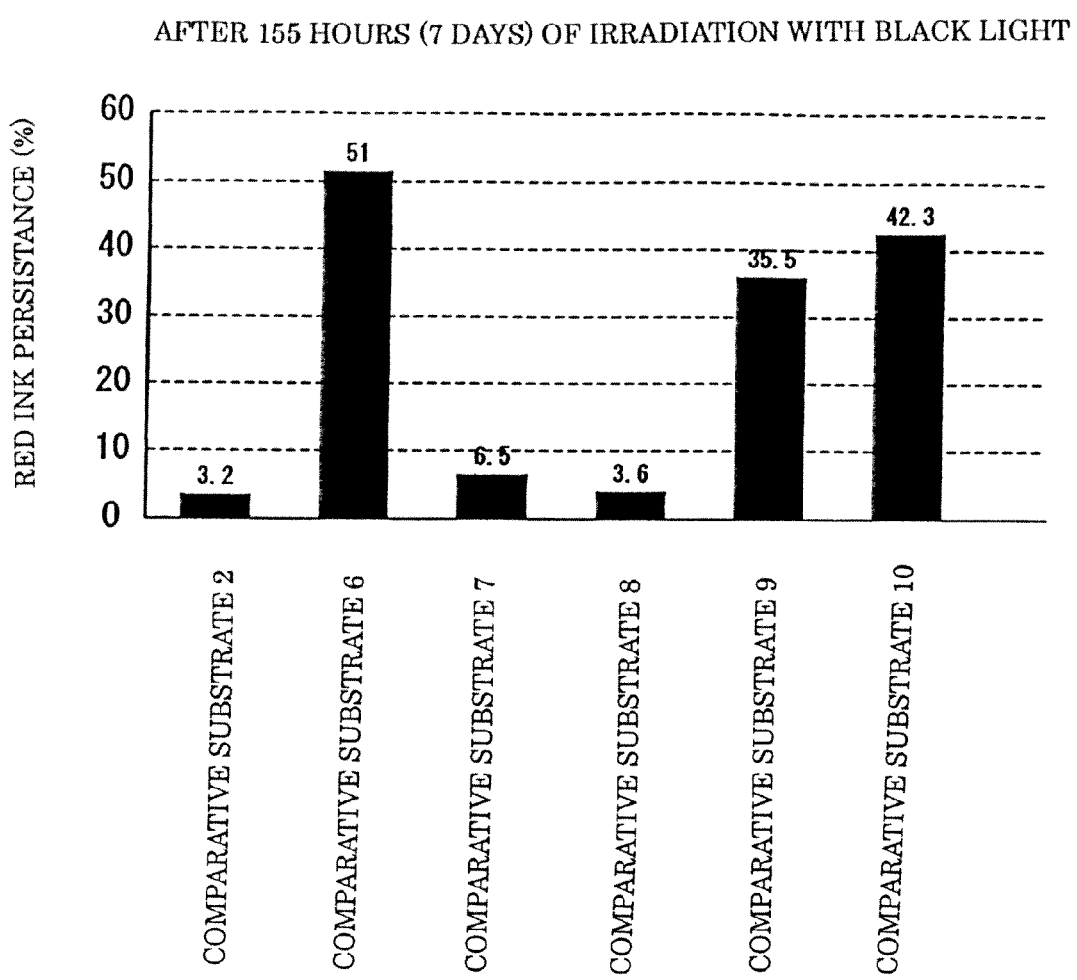

[FIG. 6]
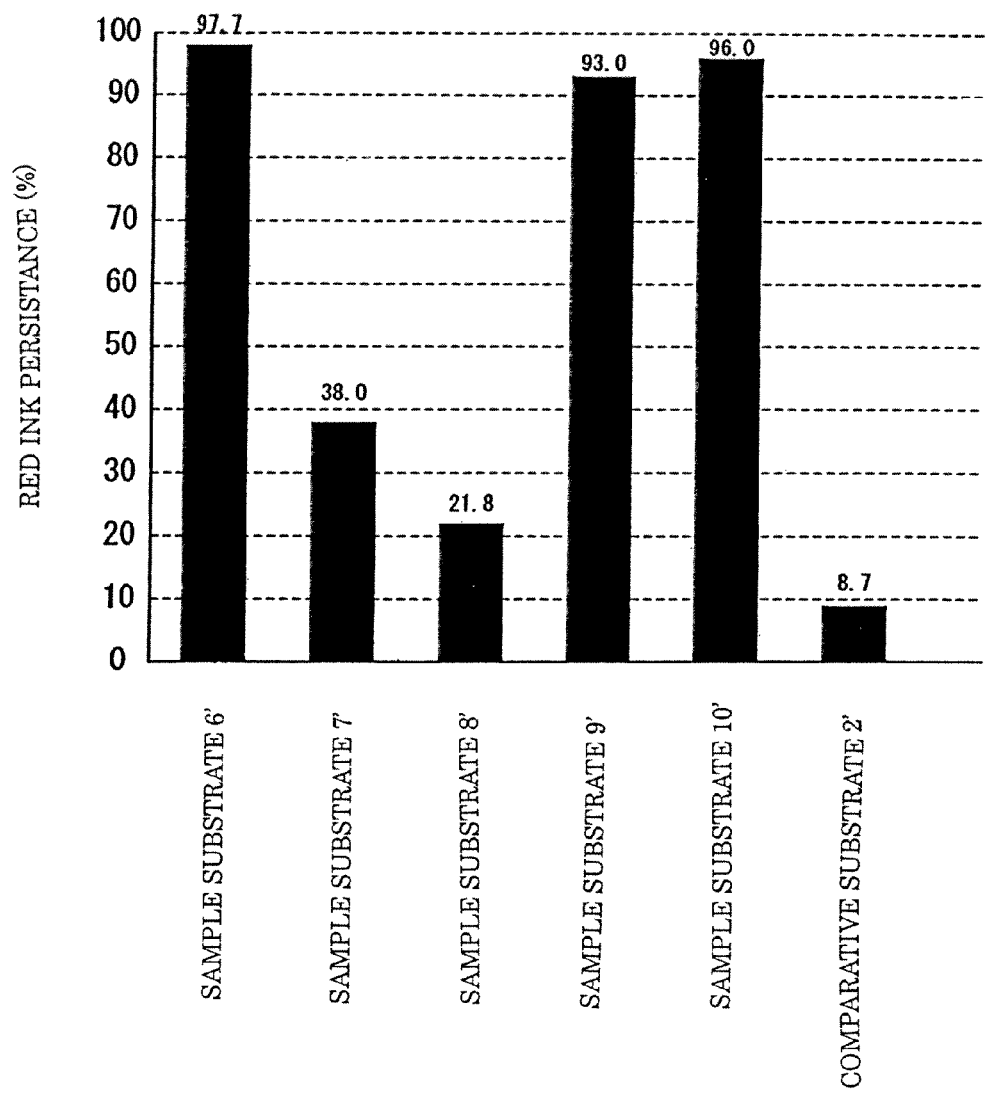

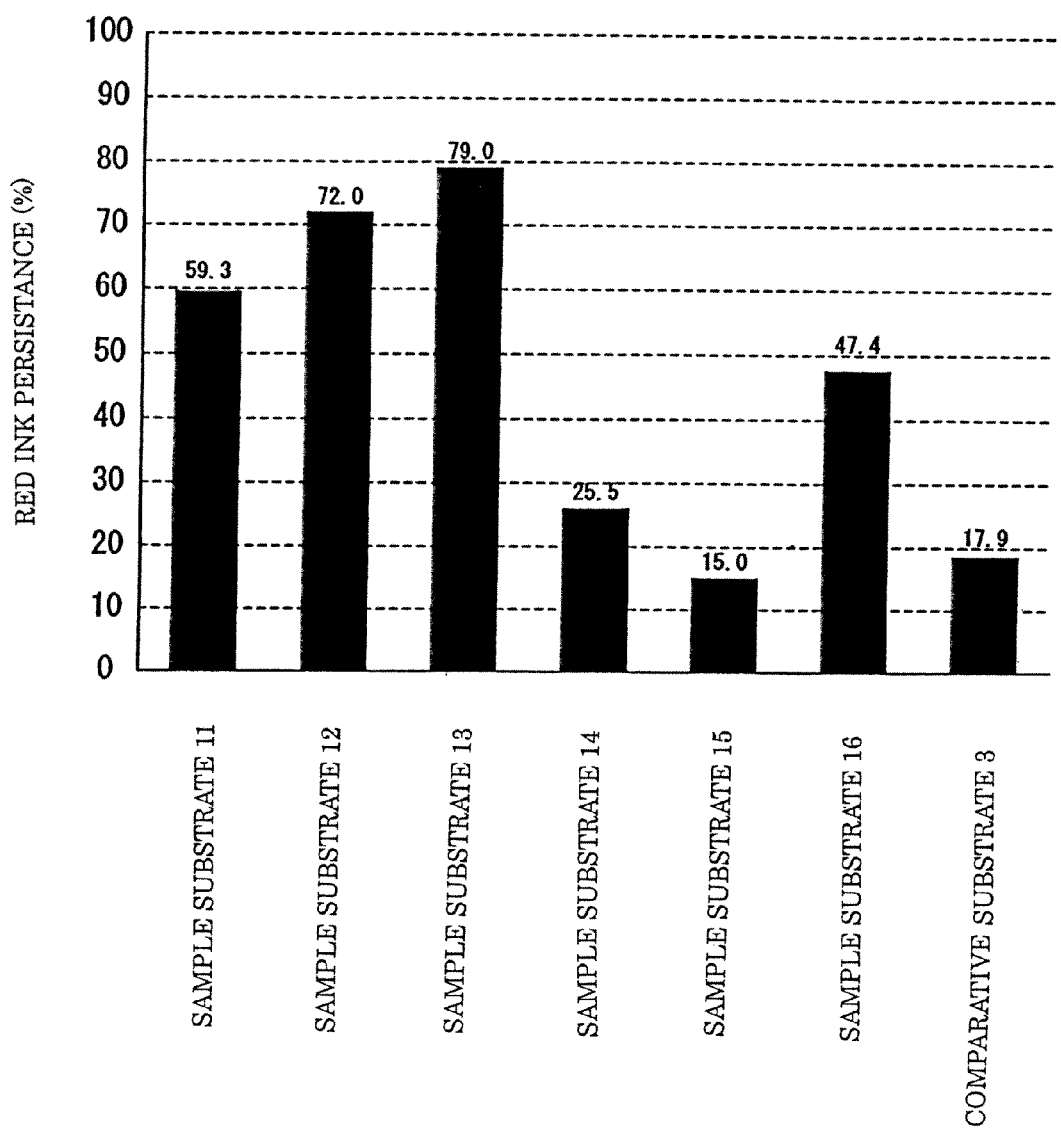
[FIG. 7]

[FIG. 8]
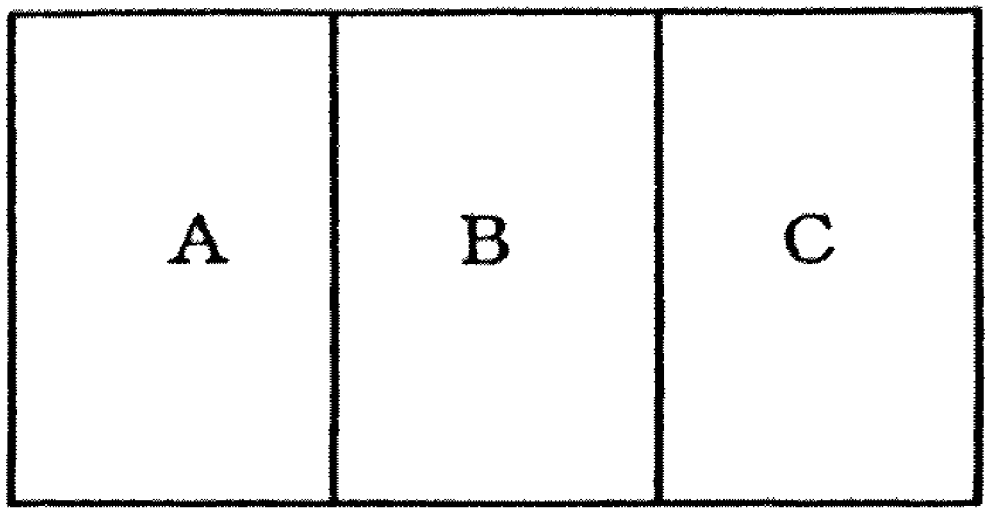

TITANIA-METAL COMPOSITE AND METHOD FOR PREPARATION THEREOF, AND FILM FORMING METHOD USING DISPERSION COMPRISING THE COMPOSITE

This application is a division of application Ser. No. 10/533,823 which was filed on May 3, 2005 now U.S. Pat. No. 8,025,976. That application was the entry into the national phase of International Application No. PCT/JP2003/014053 which was filed on Nov. 4, 2003.

TECHNICAL FIELD

The present invention relates to a titania-metal composite able to suppress or reduce discoloration or fading caused by an organic material such as a resin or an organic dye undergoing photooxidation through sunlight or the like, and a method of manufacturing the titania-metal composite.

Moreover, the present invention relates to a film formation method for forming a coating film on a substrate comprising an inorganic or organic material using an aqueous liquid or dispersion containing the titania-metal composite.

Furthermore, the present invention relates to a film formation method for forming a hydrophilic coating film having a self-cleaning function of removing soiling such as oil on the surface of a substrate comprising either an organic or inorganic material.

BACKGROUND ART

From hitherto, fading and discoloration of colored decorative coating films and the like formed on any of various substrates (e.g. printed articles, building materials, fibers, organic polymer resin products, etc.) using organic dyes and pigments has been a problem. Factors in such color degradation include photooxidation, photoreduction and thermal reactions, and various methods have been thought of as countermeasures.

For example, to prevent degradation of an organic dye or pigment or the surface of an organic polymer resin sheet, methods have been adopted such as mixing into the material an ultraviolet absorber that absorbs energy that will bring about photooxidation, or forming an oxidation-preventing film on the surface of the substrate.

Moreover, removing soiling such as oil on the surface of any of various substrates comprising either an organic or inorganic material requires effort, and hence methods of forming a coating film having an anti-soiling function or a self-cleaning function have been developed. As such a method, for example substrates that make use of a photocatalytic function using anatase-type titanium oxide developed by the present inventors have received attention.

However, an aqueous liquid or dispersion containing anatase-type titanium oxide developed by the present inventors contains not only titanium peroxide having a photocatalytic function, but also any of various metal compounds of copper, tin, iron, zinc, indium, silver, calcium, aluminum, nickel, silicon, selenium or the like, and hence in the case of using such an aqueous liquid or dispersion with an organic material such as a resin or an organic dye, degradation such as discoloration or fading through sunlight or the like has been unavoidable.

Moreover, as a film formation method that aims only for a substrate surface self-cleaning effect, art is known in which a film of silica or a silica compound is formed on the substrate, thus making the substrate surface hydrophilic so that soiling can be removed using running water.

However, a surface on which a film of anatase-type titanium oxide or the like having a photocatalytic function has been formed has strong absorptivity, and hence adsorbs substances that are to be subjected to soiling decomposition, and then these substances are decomposed by the excitation wavelength of sunlight or the like. Application of such film formation to an inorganic substrate is relatively easy, but with application to an organic substrate, degradation is brought about through decomposition of the organic substrate surface, and hence this has been coped with by forming a primer as a first layer and then a photocatalytic film as a second layer. Consequently, it has been impossible to attain both prevention of degradation caused by photooxidation of the organic substrate and an anti-soiling function using photocatalysis, with these inherently running counter to one another.

DISCLOSURE OF THE INVENTION

It is a first object of the present invention to provide a titania-metal composite able to reduce molecular bond dissociation of organic material due to sunlight, any of various types of electromagnetic radiation or the like, and a method of manufacturing the titania-metal composite.

It is a second object of the present invention to provide a film formation method using a dispersion of a titania-metal composite as above, and any of various substrates having a coating film containing a titania-metal composite as above formed thereon using the film formation method.

It is a third object of the present invention to provide a titania-metal composite that, upon forming a film thereof on the surface of a substrate that may be inorganic or organic, prevents photooxidative degradation of the substrate surface and color fading that would mar the decorativeness of the substrate surface, and has a self-cleaning function of removing soiling on the surface on which the film is formed, and a method of manufacturing the titania-metal composite, and also a film formation method using a dispersion of the titania-metal composite, and any of various substrates having a coating film containing the titania-metal composite formed thereon using the film formation method.

In the process of research and development into aqueous liquids containing titanium peroxide having a photocatalytic function doped with any of various metal compounds of copper, tin, iron, zinc, indium, silver, calcium, aluminum, nickel, silicon, selenium or the like, the present inventors have discovered that in the case of using an aqueous liquid containing titanium peroxide doped with a specific metal or a compound thereof on an organic material such as a resin or an organic dye, performance degradation such as discoloration or fading caused by sunlight or the like, and photocatalytic oxidative decomposition can be avoided.

That is, the present invention provides a composite between metallic manganese, iron, cobalt, nickel, copper or zinc or a compound thereof and anatase-type, brookite-type or rutile-type titanium dioxide having a photocatalytic activity or amorphous-type titanium dioxide not having a photocatalytic activity, and a method of manufacturing such a composite.

By adding such a metal or compound thereof, it becomes such that the photocatalytic activity is no longer exhibited, or in the case of a composite with amorphous-type titanium dioxide, even if the composite is heated to convert the crystalline form into the anatase type, photocatalytic activity will not arise. On the other hand, with a dispersion containing the titania-metal composite, there is an effect that even if the dispersion has water or an organic solvent such as an alcohol as a solvent therein or is a paint containing an organic polymer resin, degradation of the paint film after painting is prevented, and moreover degradation of the painted substrate and fading of an organic dye or pigment are prevented, i.e. degradation due to photooxidation caused by sunlight, fluorescent light or any of various types of electromagnetic radiation is reduced.

Moreover, the present invention provides a method of manufacturing a titania-metal composite, this method characterized by reacting a tetravalent titanium salt solution and a basic solution together under the presence of at least one out of copper, manganese, nickel, cobalt, iron, zinc, and compounds thereof to form a hydroxide of titanium and this metal, and then peroxidating the titanium hydroxide with an oxidizing agent, whereby the titanium oxide in the aqueous liquid is doped with at least one metal compound.

BRIEF DESCRIPTION OF THE DRAWINGS

FIG. 1 is a diagram showing the outline of an example of a method of manufacturing a titania-metal composite according to the present invention.

FIG. 2 consists of drawings showing examples in which a dispersion containing a titania-metal composite according to the present invention is applied to an organic material substrate surface.

FIG. 3 consists of drawings showing various modes for forming a coating film having excellent organic dye/pigment degradation-preventing performance using a dispersion containing a titania-metal composite according to the present invention.

FIG. 4 consists of drawings showing various modes of an organic material structure or a structure having an organic material coating film having excellent degradation prevention performance under the presence of a coating film having a photocatalytic function.

FIG. 5 is a bar chart showing the color persistence of sample substrates (sample substrates 6 to 10 and comparative substrate 2) according to the results of evaluation test 2.

FIG. 6 is a bar chart showing the color persistence of sample substrates (sample substrates 6' to 10' and comparative substrate 2') according to the results of evaluation test 2.

FIG. 7 is a bar chart showing the color persistence of sample substrates (sample substrates 11 to 16 and comparative substrate 3) according to the results of evaluation test 3.

FIG. 8 is a drawing showing a film-forming sample substrate used in 'working example 8'.

BEST MODE FOR CARRYING OUT THE INVENTION

(A) First invention

Titania-Metal Composite and Method of Manufacturing the Same (A-1) Titania-Metal Composite A titania-metal composite according to the present invention contains titanium oxide fine particles having peroxy groups, coexisting with at least one out of copper, manganese, nickel, cobalt, iron, zinc, and compounds thereof; the nature of the titania-metal composite is fine particles or a powder. Moreover, an aqueous liquid or dispersion of the titania-metal composite is prepared by reacting a tetravalent titanium salt solution and a basic solution together under the presence of at least one out of copper, manganese, nickel, cobalt, iron, zinc, and compounds thereof to form a hydroxide of titanium and this metal, and then peroxidating the titanium hydroxide with an oxidizing agent. The titanium oxide fine particles having peroxy groups contained in the aqueous liquid or dispersion may be either amorphous-type or anatase-type, or both of these may be present mixed together.

That is, with a composite between metallic manganese, iron, cobalt, nickel, copper or zinc, which come after vanadium and chromium, which come after Ti in terms of atomic number, or a compound thereof, and anatase-type, brookite-type or rutile-type titanium dioxide having photocatalytic activity or amorphous-type titanium dioxide not having photocatalytic activity, by adding the metal compound, it becomes such that the photocatalytic activity is no longer exhibited, or in the case of a composite with amorphous-type titanium dioxide, even if the composite is heated to convert the crystalline form into the anatase type, photocatalytic activity will not arise.

It is thought that these phenomena arise through the potential difference between the composited metals. As a result, with a dispersion containing the titania-metal composite, there is an effect that even if the dispersion has water or an organic solvent such as an alcohol as a solvent therein or is a paint containing an organic polymer resin, degradation of the paint film itself after painting is prevented, and moreover degradation of the painted substrate and fading of an organic dye or pigment are prevented, i.e. degradation due to photooxidation caused by sunlight, fluorescent light or any of various types of electromagnetic radiation is reduced.

(A-2) Method of Manufacturing Titania-Metal Composite

As a method of manufacturing a titania-metal composite according to the present invention, a manufacturing method using a hydrochloric acid method or a sulfuric acid method, these being common methods of manufacturing a titanium dioxide powder, may be used, or a manufacturing method using any of various liquid-dispersed titania solutions may be used. The above-mentioned metal or compound thereof can be composited in either before or after peroxidating the titania dispersion, which may be of any of various types as described below. Examples of the method are a sol-gel method known from hitherto, and the following three methods.

(A-2-1) First Manufacturing Method

A tetravalent titanium salt solution and an ammonia aqueous solution are reacted together to form a titanium hydroxide, this hydroxide is peroxidated with an oxidizing agent to form ultra-fine particles of amorphous-type titanium peroxide, and heating treatment is further carried out to convert into anatase-type titanium peroxide; in one of these processes, a metal or compound thereof as described above is mixed in.

(A-2-2) Second Manufacturing Method

A tetravalent titanium salt solution is peroxidated, the peroxidated tetravalent titanium salt solution is reacted with an ammonia aqueous solution to form a hydroxide and thus form ultra-fine particles of amorphous-type titanium peroxide, and heating treatment is further carried out to convert into anatase-type titanium peroxide; in one of these processes, a metal or compound thereof as described above is mixed in.

(A-2-3) Third Manufacturing Method

A tetravalent titanium powder or titanium oxide powder, hydrogen peroxide, and an ammonia aqueous solution are reacted together to carry out titanium hydroxide formation and peroxidation simultaneously and thus form ultra-fine particles of amorphous-type titanium peroxide, and heating treatment is further carried out to convert into anatase-type titanium peroxide; in one of these processes, a metal or compound thereof as described above is mixed in.

Note that through the peroxidation with the oxidizing agent, amorphous-type titanium peroxide is formed, and it goes without saying that this can be used as the titania-metal composite aqueous liquid or dispersion of the present invention. Moreover, if this is heated, the titanium is converted into the anatase type, and it goes without saying that this can also be used as the aqueous liquid or dispersion of the present invention.

(A-2-4) Manufacturing Method Using Sol-Gel Method

A solvent such as water or an alcohol, and an acid or basic catalyst are mixed and stirred with a titanium alkoxide to hydrolyze the titanium alkoxide. As a result, a sol solution of titanium oxide ultra-fine particles is produced. A metal or compound thereof as described above is mixed in before or after the hydrolysis. Note that the titanium oxide obtained in this way is amorphous-type modified with peroxy groups.

As the titanium alkoxide, a compound represented by the general formula $Ti(OR')_4$ (wherein R' is an alkyl group), or a compound in which one or two of the alkoxide groups (OR') in this general formula have been substituted with carboxyl groups or β-dicarbonyl groups, or a mixture thereof is preferable.

Specific examples of the titanium alkoxide include $Ti(O-iso-C_3H_7)_4$, $Ti(O-n-C_4H_9)_4$, $Ti(O-CH_2CH(C_2H_5)C_4H_9)_4$, $Ti(O-C_{17}H_{35})_4$, $Ti(O-iso-C_3H_7)_2[CO(CH_3)CHCOCH_3]_2$, $Ti(O-nC_4H_9)_2[OC_2H_4N(C_2H_4OH)_2]_2$, $Ti(OH)_2[OCH(CH_3)COOH]_2$, $Ti(O-CH_2CH(C_2H_5)CH(OH)C_3H_7)_4$, and $Ti(O-nC_4H_9)_2[OCOC_{17}H_{35}]$.

(A-3) Regarding the First Manufacturing Method

Next, a detailed description will be given of the first manufacturing method. As shown in FIG. 1, a solution of a tetravalent titanium salt such as titanium tetrachloride and a basic solution such as ammonia water are mixed together in the presence of at least one out of copper, manganese, nickel, cobalt, iron, zinc, and compounds thereof, thus reacting the tetravalent titanium salt and the basic solution together, and hence producing a hydroxide of the metal and a hydroxide of titanium.

Here, there are no particular limitations on the concentration or temperature of the reaction solution, but it is preferable to carry out the reaction with a dilute solution at ambient temperature. The reaction is a neutralization reaction, and hence it is preferable to adjust from acidic to neutral, i.e. to pH 7. If the hydroxide obtained in this way is washed with pure water, and then peroxidated with a hydrogen peroxide aqueous solution, then an aqueous liquid or dispersion containing amorphous-type titanium oxide fine particles having peroxy groups, i.e. an aqueous liquid or dispersion containing a titania-metal composite according to the present invention, can be manufactured.

Hydrogen peroxide is preferable as the oxidizing agent when carrying out the peroxidation, and there are no particular limitations on the concentration thereof, although 30 to 40% is preferable. Note that the oxidizing agent is not limited to being hydrogen peroxide, but rather, as described earlier, any of various oxidizing agents can be used so long as a peroxide of titanium can be formed. As described above, upon mixing titanium hydroxide and hydrogen peroxide together, a peroxidation reaction gradually proceeds, and a dispersion of amorphous-type titanium peroxide is formed. It is preferable to cool before carrying out this oxidation. Here, it is preferable to carry out the cooling such that the temperature of the titanium hydroxide becomes 1 to 5° C.

(A-4) Tetravalent Titanium Salt

As the tetravalent titanium salt used in the manufacture of the titania-metal composite aqueous liquid or dispersion according to the present invention, any of various titanium compounds can be used so long as a gel of titanium hydroxide, also known as ortho-titanic acid ($H_4TiO_4$), can be formed upon reacting with a basic solution such as ammonia water or a sodium hydroxide solution; examples are water-soluble inorganic acid salts of titanium such as titanium tetrachloride, titanium sulfate, titanium nitrate and titanium phosphate. Other examples are water-soluble organic acid salts such as titanium oxalate. Out of these various titanium compounds, titanium tetrachloride is preferable from the standpoints of the water solubility being particularly good, and components other than titanium in the titanium compound not remaining in the coating film-forming aqueous liquid or dispersion manufactured.

Moreover, there are no particular limitations on the concentration of the tetravalent titanium salt solution so long as the concentration during reaction is within a range such that a gel of titanium hydroxide can be formed, but a relatively dilute solution is preferable. Specifically, the concentration of the tetravalent titanium salt solution is preferably 5 to 0.01 wt %, more preferably 0.9 to 0.3 wt %.

(A-5) Basic Solution

Moreover, as the basic solution reacted with the tetravalent titanium salt solution, any of various ones can be used so long as a gel of titanium hydroxide can be formed upon reaction with the tetravalent titanium salt solution; examples include ammonia water, a sodium hydroxide aqueous solution, a sodium carbonate aqueous solution, and a potassium hydroxide aqueous solution, with ammonia water being preferable.

Moreover, there are no particular limitations on the concentration of the basic solution so long as the concentration during reaction is within a range such that a gel of titanium hydroxide can be formed, but a relatively dilute solution is preferable. Specifically, the concentration of the basic solution is preferably 10 to 0.01 wt %, more preferably 1.0 to 0.1 wt %. In particular, the concentration in the case of using ammonia as the basic solution is preferably 10 to 0.01 wt %, more preferably 1.0 to 0.1 wt %.

(A-6) Oxidizing Agent

As the oxidizing agent for subsequently oxidizing the titanium hydroxide formed, any of various oxidizing agents can be used without limitation so long as a peroxide can be formed through the oxidation; hydrogen peroxide is preferable since residual matter such as metal ions or acid ions will not arise in the coating film-forming liquid manufactured.

(A-7) Doped Metal Compound

Examples of compounds of copper, manganese, nickel, cobalt, iron and zinc respectively that may be made to coexist with the solution of the tetravalent titanium salt such as titanium tetrachloride are as follows.

Ni compounds: $Ni(OH)_2$, $NiCl_2$
Co compounds: $Co(OH)NO_3$, $Co(OH)_2$, $CoSO_4$, $CoCl_2$
Cu compounds: $Cu(OH)_2$, $Cu(NO_3)_2$, $CuSO_4$, $CuCl_2$, $Cu(CH_3COO)_2$
Mn compounds: $MnNO_3$, $MnSO_4$, $MnCl_2$
Fe compounds: $Fe(OH)_2$, $Fe(OH)_3$, $FeCl_3$
Zn compounds: $Zn(NO_3)_2$, $ZnSO_4$, $ZuCl_2$ The concentration of the titanium peroxide in the aqueous liquid or dispersion (the total amount including coexisting compounds of copper, manganese, nickel, cobalt, iron or zinc) is preferably 0.05 to 15 wt %, more preferably 0.1 to 5 wt %. Moreover, regarding the content of the at least one out of copper, manganese, nickel, cobalt, iron, zinc, and compounds thereof, the molar ratio between the titanium and this metal component is preferably in a range of 1:0.01 to 1:0.5, more preferably 1:0.03 to 1:0.1.

(A-8) Effects of Using Titania-Metal Composite

With a substrate having formed thereon a film of titania doped with at least one out of copper, manganese, nickel, cobalt, iron, zinc, and compounds thereof according to the present invention, the promotion of oxidative degradation of the substrate surface caused by ultraviolet radiation (sunlight) or short-wavelength electromagnetic radiation that causes photooxidation can be prevented or reduced.

With such photooxidation, it is said that .OH (hydroxyl radicals) or $^1O_2$ (singlet oxygens) are produced from oxygen or moisture in the air or organic matter through electromagnetic radiation, and cause oxidative degradation inside or on the outside of the substrate.

The titania-metal composite according to the present invention is able to stabilize the unstable active state of such radicals, whereby photooxidative degradation of the surface of a substrate comprising an organic material or an inorganic material by ultraviolet radiation (sunlight) or radical-producing electromagnetic radiation can be prevented or reduced, and degradation of an organic resin, color degradation (fading) or substrate degradation can be prevented, and oxidative degradation of the surface of an inorganic material can be reduced.

(B) Second Invention

Film Formation Method (Organic Material Structure) Using Aqueous Liquid or Dispersion as Described Above (B-1) Film Formation Method Using Titania-Metal Composite Aqueous Liquid or Dispersion An organic material structure according to the present invention has a coating film containing titanium oxide fine particles doped with at least one out of copper, manganese, nickel, cobalt, iron, zinc, and compounds thereof (a titania-metal composite) on a surface thereof, or has such particles dispersed therein.

As shown in FIGS. 2A and B, the former can be manufactured by building up a layer of an aqueous liquid or dispersion containing a titania-metal composite as described in (A) above onto, or permeating such an aqueous liquid or dispersion into, the surface of an organic material substrate. Moreover, as shown in FIG. 2C, the latter can be manufactured by dispersing an aqueous liquid or dispersion containing a titania-metal composite as described in (A) above into an organic material, and then molding into a desired shape.

(B-2) Film Formation Method Having Function of Preventing Fading or Degradative Discoloration of Organic Material By using an aqueous liquid or dispersion containing a titania-metal composite as described in (A) above in one of the undermentioned modes, fading of an organic dye or pigment caused by ultraviolet radiation or the like, or degradative discoloration of an organic material can be suppressed. Note that the undermentioned modes are illustrated in FIG. 3.

(1) A titania-metal composite aqueous liquid or dispersion is mixed with an organic dye or pigment or an organic polymer resin containing an organic dye or pigment, and a coating film is formed on a substrate surface.

(2) A coating film of a titania-metal composite aqueous liquid or dispersion according to the present invention (hereinafter referred to as a 'degradation-preventing coating film') is formed on a substrate surface, and then a coating film of an organic dye or pigment or an organic polymer resin containing an organic dye or pigment is formed on the surface (FIG. 3A).

(3) Two types of degradation-preventing coating films are formed on a substrate surface, and then a coating film of an organic dye or pigment or an organic polymer resin containing an organic dye or pigment is formed on the surface (FIG. 3B).

(4) A coating film of an organic dye or pigment or an organic polymer resin containing an organic dye or pigment is formed on a substrate surface, and then one type of degradation-preventing coating film is, or two types of degradation-preventing coating film are, formed on the surface (FIG. 3C).

(5) A coating film containing two types of aqueous liquids of the present invention is formed on a substrate surface, and then a coating film of an organic dye or pigment or an organic polymer resin containing an organic dye or pigment is formed on the surface (FIG. 3D).

(B-3) Film Formation Method for Giving Both Fading/Discoloration-Preventing Function and Photocatalytic Function By using an aqueous liquid or dispersion containing a titania-metal composite as described in (A) above in one of the undermentioned modes, in the case of forming a coating film having a photocatalytic function (a photocatalytic film) on a substrate, again degradation such as fading or discoloration of an organic material substrate or a coating film of an organic dye or pigment formed thereon can be avoided or suppressed.

That is, in the case of making an organic substrate surface have a photocatalytic function, if a film of a photocatalytic semiconductor metal oxide is formed directly thereon, then chalking is brought about, and hence hitherto a silica compound or amorphous-type titanium peroxide has been used.

However, a silica compound has organic groups, and amorphous-type titanium peroxide is converted into anatase-type through sunlight, and hence with an organic substrate surface, chalking is brought about, and thus there has been a problem with durability.

It is thus possible to form an intermediate film using a titania-metal composite aqueous liquid or dispersion according to the present invention between the organic substrate and the photocatalytic film so as to realize a blocking function of protecting the organic substrate. That is, a titania-metal composite aqueous liquid or dispersion according to the present invention has excellent transparency and adhesive film-forming power, and hence degradation of the substrate can be prevented, and fading can be reduced, and at the same time oxidative decomposition of the substrate due to the photocatalytic function can be prevented.

The titania of the intermediate film will not exhibit a photocatalytic ability even upon being converted into the anatase type through sunlight. The thickness of the intermediate film is preferably 0.05 to 2.0 μm, more preferably 0.1 to 1.0 μm.

There are the following three modes of a film formation method for giving both a fading/discoloration-preventing function and a photocatalytic function, and these modes are illustrated in FIG. 4.

(1) A layer of a degradation-preventing coating film is built up on an organic material substrate surface, and then a photocatalytic film is formed on the surface (FIG. 4A).

(2) A degradation-preventing coating film is formed by being permeated into an organic material substrate surface, and then a photocatalytic film is formed on the surface (FIG. 4B).

(3) A coating film of an organic dye or pigment is formed on a substrate surface, then a degradation-preventing coating film is built up on the surface, and then a photocatalytic film is formed on the surface (FIG. 4C).

In each of these modes, the degradation-preventing coating film is thus formed between the photocatalytic film and the organic material substrate surface or an organic dye/pigment coating film.

(B-4) Method of Forming Degradation-Preventing Coating Film

There are no particular limitations on layer-building film-forming means for forming a degradation-preventing coating film as described above; examples include roll coating, gravure coating, vapor deposition, spin coating, dip coating, bar coating, and spray coating. Moreover, in the case of forming the degradation-preventing coating film by permeating in, examples include spray coating and dip coating. After the coating film has been formed, drying is preferably carried out at ambient temperature or with heating, preferably at a temperature of 60 to 200° C. There are also no particular limitations on the heating means; examples include a constant-temperature dryer and an electromagnetic heater.

Regarding the thickness of the coating film formed, the thickness after drying is preferably 0.01 to 0.5 μm, more preferably 0.1 to 0.2 μm.

(B-5) object having coating film formed thereon

There are no particular limitations on the object on which a coating film is formed using an aqueous liquid or dispersion containing a titania-metal composite according to the present invention, so long as this object is one that will undergo fading or degradative discoloration through ultraviolet radiation or visible light from sunlight, an electromagnetic radiation generator or the like; examples include colored coated surfaces, externally installed colored decorative materials, and organic polymer resins.

For example, as an inorganic substrate, the coating film can be effectively used on many architectural structures, civil engineering structures, constructed objects and machines, for example on glass, metal, ceramic plates such as tiles, stone or concrete, particularly on the outside. Moreover, as an organic substrate, although timber, paper and so on are also possibilities, the coating film can be effectively used in particular on the surface of an organic polymer resin sheet, a painted surface having an organic polymer resin mixed therein, or the surface of a sprayed material or a plastering material.

More specifically, as a resin sheet, use is possible, for example, on the surface of a sheet or molded article of a polycarbonate resin, an acrylic resin, a polyester resin, an ABS resin, a vinyl chloride resin or the like.

Moreover, regarding coating materials, the coating film can be used effectively on the surface of a so-called paint, plastering material or sprayed material containing a synthetic resin such as an alkyd resin, an acrylic resin, an amino resin, a polyurethane resin, an epoxy resin, a silicone resin, a fluororesin, an acrylic silicone resin, an unsaturated polyester resin, an ultraviolet-curable resin, a phenol resin, a vinyl chloride resin, or a synthetic resin emulsion. Furthermore, the coating film is also effective on the surface of plastic products, building materials, vehicles, aircraft, and machinery.

The film thickness in the case of forming the film on such a substrate is preferably 0.01 to 1.0 μm more preferably 0.05 to 0.3 μm. Moreover, in the case of a coating material having an organic polymer resin or the like mixed therein, the film thickness is preferably 1.0 to 100 μm, more preferably 10 to 50 μm.

Moreover, as the film-forming method, all publicly known methods can be used; for example, spray coating, dip coating, flow coating, spin coating, roll coating, brush coating, sponge coating or the like can be used, although to improve physical properties such as the hardness of the film formed and the adhesion to the substrate, it is preferable to heat within a permissible heating temperature range for the substrate or coating material.

(B-6) Mixing into Inorganic Material or Resin Material

A titania-metal composite according to the present invention can be used not only in a method of forming a film on an organic polymer resin surface, but can also be mixed into a resin material to obtain a resin sheet, a molded article, a paint, a sprayed material or a plastering material having similar functional properties.

Resins that can be used include acrylic resins, polyester resins, melamine resins, urea resins, polyamide resins, polyimide resins, epoxy resins, phenol resins, ketone resins, polyurethane resins, silicone resins, fluororesins, and celluloses. Moreover, these resins may have a substance such as a silicone, an amine or an epoxy-modified resin added thereto.

Moreover, a titania-metal composite according to the present invention can be added and mixed in during the manufacturing process of any of a tile glaze, a hollow iron plate decorative frit, or plate glass or glass fibers having an Si compound as a principal component thereof.

The mixing ratio between the inorganic material or resin material and the titania-metal composite according to the present invention is selected as appropriate according to whether the titania-metal composite is mixed in as a fine powder or is mixed in as a solution.

(B-7) Applications

Various things as listed below can be given as examples of things to which an aqueous liquid or dispersion containing a titania-metal composite according to the present invention can be applied so as to obtain working effects as described above.

(1) Building materials (interior and exterior materials): Glass, metal, tiles, concrete, coatings, resins, sealing materials, timber, sprayed materials, tent fabric, etc.

(2) Equipment: Air conditioners, outdoor air conditioners, cooling towers, kitchens, sanitary equipment, lighting fixtures, etc.

(3) Glass substrates: Cameras, spectacles, contact lenses, lenses, mirrors, glass tableware, showcases, glass fibers (for cameras), etc.

(4) Automobiles, aircraft, trains: bodies, glass, etc.

(5) Others: Insulators, antistatic substrate surfaces (televisions, glass, acrylic resins, polycarbonate resin sheets, faces, etc.)

(C) Third Invention

Adding Additives, Conferring Anti-Soiling Performance (C-1) Adding Additives

As described above, a composite between amorphous-type and/or anatase-type titanium oxide which is able to prevent or reduce photooxidative decomposition of organic compounds, and copper, manganese, nickel, cobalt, iron, zinc or a compound thereof is able to protect an organic substrate from degradation by ultraviolet radiation or the like without having a photocatalytic function, thus improving the decorativeness of the surface on which the film of the composite is formed; nevertheless, to confer anti-soiling performance whereby soiling is kept off the surface, it is preferable to further add additives to improve the leveling ability (surface activity) so as to make the surface on which the film of the composite is formed hydrophilic and thus make formation of the film on a water-repellent substrate easier.

To do this, any of various silicone oils can be used. An alkylsilicate or polyether type can be used, or as a modified silicone oil, a polyether-modified or alkyl-modified type can be used; out of these, a polyether-modified polydimethylsiloxane type paint additive (leveling agent) having a structure that is a composite of the above is particularly good.

The mixing ratio between the composite of amorphous-type and/or anatase-type titanium oxide and copper, manganese, nickel, cobalt, iron, zinc or a compound thereof, and the additive is preferably in a range of 1:0.02 to 1:20, more preferably 1:0.05 to 1:10. Moreover, the titanium oxide is preferably modified with peroxy groups, i.e. is preferably titanium peroxide.

When forming a film using a solution of the above, the film thickness after drying by heating is preferably approximately 0.01 to 1.0 μm, more preferably 0.05 to 0.3 μm.

The aqueous liquid or dispersion will not have a photocatalytic ability toward glass, metal or a ceramic plate, or an organic substrate such as an acrylic plate, a PP plate or a polycarbonate plate, and hence an anti-soiling coating can be formed with a single coat, without a blocking layer being required. Moreover, as an organic polymer resin or sheet thereof to which the properties of the above invention are conferred, the aqueous liquid or dispersion can be mixed into an organic resin such as an acrylic resin, a polyester resin or a polycarbonate resin.

(C-2) Leveling Agents and Dispersants

By adding a leveling agent or dispersant that makes film formation easier to the titania-metal composite according to the present invention, film formation can be carried out uniformly, and the titania-metal composite can be dispersed over a substrate uniformly. As such a leveling agent or dispersant, a composite of a resin-type, a silicone, a silane compound, a rubber-type silicone, a silicone powder, an organic-modified silicone, a silicone oil or the like is preferable. These utilize the surface activating effect of a silicone polymer, and one having an alkylsilicate structure or a polyether structure, or both an alkylsilicate structure and a polyether structure in the molecule thereof is preferable.

Here, 'alkylsilicate structure' refers to a structure in which alkyl groups are added to silane atoms in the siloxane backbone. Specifically, a substance having siloxane linkages (—Si—O—) as a main chain such as polydimethylsiloxane is suitable, although there is no limitation thereto.

Moreover, 'ether structure' refers to a structure in which alkylene groups are bonded together by ether linkages such as a polyalkylene oxide. Specific examples are ones having a structure such as polyethylene oxide, polypropylene oxide, polytetramethylene oxide, a polyethylene oxide-polypropylene oxide block copolymer, a polyethylene-polytetramethylene glycol copolymer, or a polytetramethylene glycol-polypropylene oxide copolymer. Out of these, a polyethylene oxide-polypropylene oxide block copolymer is particularly suitable from the viewpoint of being able to control the wettability through the block degree and the molecular weight, although there is no limitation thereto.

An organic substance having both an alkylsilicate structure and a polyether structure in the molecule thereof is particularly preferable. Specifically, a polyether-modified polysiloxane type paint additive such as polyether-modified polydimethylsiloxane can be used; this can be manufactured using a publicly known method, for example using a method described in Synthesis Example 1, 2, 3 or 4 in Japanese Patent Application Laid-open No. H4-242499 or the Reference Example in Japanese Patent Application Laid-open No. H9-165318.

For example, a polyethylene oxide-polypropylene oxide block copolymer-modified polydimethylsiloxane obtained by reacting a both-end-metallyl polyethylene oxide-lene oxide-polypropylene oxide block copolymer with dihydropolydimethylsiloxane is suitable.

As a leveling agent, TSF4445 or TSF4446 (both made by GE Toshiba Silicones), SH200 (made by Dow Corning Toray Silicone Co., Ltd.), a KP series one (made by Shin-Etsu Chemical) or the like can be used.

Moreover, as a dispersant, DC3PA or ST869A (both made by Dow Corning Toray Silicone Co., Ltd.) or the like can be used. In addition, one that is not for paints can be used as appropriate so long as the above properties can be conferred.

Moreover, a coating agent type having a silane compound having amino groups, epoxy groups or methacryloxy groups, i.e. a so-called silane coupling agent, added thereto can be constructed. Such a coating agent contains a large amount of Si—O linked matter, and hence the film hardness and the adhesion to the substrate can be improved.

The mixing ratio (wt %) between the titania-metal composite according to the present invention and each additive is preferably in a range of 1:0.02 to 1:20, more preferably 1:0.05 to 1:10.

(C-3) Effect of Combining Titania-Metal Composite and Additive

With a surface having formed thereon a coating film in which are combined a titania-metal composite according to the present invention and an additive comprising a silicone or modified silicone having an alkylsilicate structure or a polyether structure or both of these structures, a photocatalytic function is not exhibited upon being subjected to exciting light, and anti-soiling, anti-microbial ability, gas decomposition and water purification through so-called organic compound decomposition are not observed. By forming a film using such a coating film liquid, photooxidative degradation of a substrate can thus be prevented.

On the other hand, by adding an additive as above to a titania-metal composite according to the present invention, anti-soiling, anti-microbial and hydrophilic functions that are not photocatalytic organic decomposition are realized. The present inventors have described the working mechanism for this in detail in separately filed Japanese Patent Application No. 2000-374750. That is, it is thought that this phenomenon does not involve photocatalysis, but rather upon being subjected to ultraviolet radiation, sunlight or electromagnetic radiation that will bring about photooxidative degradation, anti-soiling, anti-microbial, hydrophilic and anti-rusting functions are realized in connection with photooxidation that occurs in the organic material or on the surface on which a film has been formed.

That is, a titania-metal composite according to the present invention to which such an additive has been added not only does not have a photocatalytic function, but moreover has a function of protecting organic bonds from molecular bond dissociation energy (photooxidative power) due to electromagnetic radiation such as ultraviolet radiation, and hence the durability of the film formed is improved, whereby a protective effect is obtained in that a drop in the lifetime of the substrate or a drop in the decorativeness caused by degradation or the like over a long period is prevented. As a result, with an inorganic or organic substrate surface having the film formed thereon, substrate degradation and fading are prevented, and anti-soiling, anti-microbial, hydrophilic and anti-rusting functions are exhibited for the surface having the film formed thereon. Regarding the effect of both of these types of function being exhibited, highly effective use is possible with organic substrates, in particular organic polymer resin substrates and coating material surfaces.

Hitherto, because organic materials are susceptible to ultraviolet radiation, preventing a drop in functionality or decorativeness in terms of commercial value with such substrates has been a great technical problem; however, by adding an additive as above to a titania-metal composite according to the present invention, an effect that both of the above types of function are exhibited is obtained, and hence use is possible for revolutionary inorganic or organic substrates having a function of resolving problems that have been outstanding for many years, for example not only inorganic ones but also organic polymer resin sheets and paints or plastering materials containing organic polymer resins.

(C-4) Applications

A fields in which this art can be utilized to improve anti-soiling commercial value is sealing materials, which are the greatest cause of soiling of exterior substrates in architecture, civil engineering, constructed objects and so on. Sealing materials are necessities for absorbing expansion, contraction and displacement due to heating of exterior substrates and earthquakes, and are used in the joints of the majority of architectural structures, civil engineering structures and constructed objects.

As such sealing materials, there are silicone types, modified silicone types, polysulfide types, polyurethane types, butyl rubber types and so on; the higher the performance of a sealing material in terms of weather resistance, durability, adhesion and so on, the more surface-charged material or low-molecular-weight silicone oil due to contamination is discharged, resulting in being the greatest cause of soiling of exterior substrates. The art of the present invention can also be used effectively in such sites.

(C-4-1) First Method

A first method of applying a titania-metal composite aqueous liquid or dispersion having an additive added thereto according to the present invention onto a sealing material is a method in which a coating material to which have been added the titania-metal composite and a silicone or modified silicone solution having an alkylsilicate structure or a polyether structure or both of these structures with a leveling ability or dispersing ability (a silane compound may also be added) is applied directly onto the surface of the sealing material to form a film.

(C-4-2) Second Method

A second method of applying a titania-metal composite aqueous liquid or dispersion having an additive added thereto according to the present invention onto a sealing material is a method in which a coating material of a film-forming silicone, silane compound or the like is used as an intermediate film to reduce discharge of contaminants or exposure to charged substances, this being as a primer for a coating material as above on the sealing material surface.

As a silicone used as the intermediate film, a silicone for a weather-resistant heat-resistant coating material, a reinforcing coating material or a water-repellant coating material, a silicone for adding to a paint, or the like can be used, so long as this is one that can be used as a silicone coating material. As a commercial product, SR2410 or SE1980 (both made by Dow Corning Toray Silicone Co., Ltd.) or the like can be used.

Moreover, as a silane compound, one having methoxy groups, ethoxy groups, amino groups, epoxy groups, methacryl groups or methacryloxy groups, and having a silane type oligomer or polysiloxane component can be used. As a commercial product, Dryseal M or Dryseal W (both made by Dow Corning Toray Silicone Co., Ltd.), Aquaseal 200S or 500S (both made by Sumitomo Seika Chemicals Co., Ltd.) or the like can be used.

The thickness of the intermediate film is preferably 0.05 to 50 µm, more preferably 0.1 to 20 µm. Moreover, as the application method, this is carried out after filling with a caulking material at the work site, and hence brushing or spraying can be used.

WORKING EXAMPLES

Following is a description of working examples showing the effects of the first to third inventions described above, fading/discoloration performance evaluation tests and so on.

Working Examples 1

Working Examples Relating to Method of Manufacturing Titania-Metal Composite Aqueous Liquids/Dispersions In these 'working examples 1', composites doped with various metals were prepared by using a method of manufacturing an aqueous liquid or dispersion containing a titania-metal composite according to the present invention.

Working Example 1-1

Copper-Doped Amorphous Type 0.463 g of 97% $CuCl_2.2H_2O$ (made by Nihon Kagaku Sangyo Co., Ltd.) was completely dissolved in 500 ml of pure water, 10 g of a 50% titanium tetrachloride solution (made by Sumitomo Sitix) was further added to the solution, and pure water was added to make up to 1000 ml, whereby a solution was prepared. Ammonia water obtained by diluting 25% ammonia water (made by Takasugi Pharmaceutical Co., Ltd.) by a factor of 10 was instilled into the solution to adjust the pH to 7.0, whereby a mixture of copper hydroxide and titanium hydroxide was precipitated.

The precipitate was continually washed with pure water until the conductivity of the supernatant was not more than 0.8 mS/m; the washing was stopped when the conductivity had become 0.8 mS/m, whereupon 340 g of a liquid containing 0.81 wt % of the hydroxide was produced. Next, 25 g of 35% hydrogen peroxide (made by Taiki Chemical Industries Co., Ltd.) was added while cooling the liquid to 1 to 5° C., and stirring was carried out for 16 hours, whereby 365 g of a transparent green dispersion of copper-doped amorphous-type titanium peroxide of concentration 0.90 wt % was obtained. This was diluted with pure water, thus preparing 385 g of a 0.85 wt % copper-doped amorphous-type titanium peroxide dispersion.

Working Example 1-2

Nickel-Doped Amorphous Type 0.594 g of $NiCl_2.6H_2O$ (made by Nihon Kagaku Sangyo Co., Ltd.) was completely dissolved in 500 ml of pure water, 10 g of a 50% titanium tetrachloride solution (made by Sumitomo Sitix) was further added to the solution, and pure water was added to make up to 1000 ml, whereby a solution was prepared. Ammonia water obtained by diluting 25% ammonia water (made by Takasugi Pharmaceutical Co., Ltd.) by a factor of 10 was instilled into the solution to adjust the pH to 7.0, whereby a mixture of nickel hydroxide and titanium hydroxide was precipitated.

The precipitate was continually washed with pure water until the conductivity of the supernatant was not more than 0.8 mS/m; the washing was stopped when the conductivity had become 0.65 mS/m, whereupon 393 g of a liquid containing 0.77 wt % of the hydroxide was produced. Next, 25 g of 35% hydrogen peroxide (made by Taiki Chemical Industries Co., Ltd.) was added while cooling the liquid to 1 to 5° C., and stirring was carried out for 16 hours, whereby 374 g of a transparent pale yellow dispersion of nickel-doped amorphous-type titanium peroxide of concentration 0.87 wt % was obtained. This was diluted with pure water, thus preparing 381 g of a 0.85 wt % nickel-doped amorphous-type titanium peroxide dispersion.

Working Example 1-3

Cobalt-Doped Amorphous Type 0.626 g of $CoCl_2.6H_2O$ (made by Kanto Kagaku) was completely dissolved in 500 ml of pure water, 10 g of a 50% titanium tetrachloride solution (made by Sumitomo Sitix) was further added to the solution, and pure water was added to make up to 1000 ml, whereby a solution was prepared. Ammonia water obtained by diluting 25% ammonia water (made by Takasugi Pharmaceutical Co., Ltd.) by a factor of 10 was instilled into the solution to adjust the pH to 7.0, whereby a mixture of cobalt hydroxide and titanium hydroxide was precipitated.

The precipitate was continually washed with pure water until the conductivity of the supernatant was not more than 0.8 mS/m; the washing was stopped when the conductivity had become 0.68 mS/m, whereupon 341 g of a liquid containing 0.72 wt % of the hydroxide was produced. Next, 25 g of 35% hydrogen peroxide (made by Taiki Chemical Industries Co., Ltd.) was added while cooling the liquid to 1 to 5° C., and stirring was carried out for 16 hours, whereby 364 g of a semi-transparent dark green dispersion of cobalt-doped amorphous-type titanium peroxide of concentration 0.85 wt % was obtained.

Working Example 1-4

Manganese-Doped Amorphous Type 0.521 g of $MnCl_2.4H_2O$ (made by Komune Kagaku Yakuhin) was completely dissolved in 500 ml of pure water, 10 g of a 50% titanium tetrachloride solution (made by Sumitomo Sitix) was further added to the solution, and pure water was added to make up to 1000 ml, whereby a solution was prepared. Ammonia water obtained by diluting 25% ammonia water (made by Takasugi Pharmaceutical Co., Ltd.) by a factor of 10 was instilled into the solution to adjust the pH to 7.0, whereby a mixture of manganese hydroxide and titanium hydroxide was precipitated.

The precipitate was continually washed with pure water until the conductivity of the supernatant was not more than 0.8 mS/m; the washing was stopped when the conductivity had become 0.65 mS/m, whereupon 343 g of a liquid containing 0.77 wt % of the hydroxide was produced. Next, 25 g of 35% hydrogen peroxide (made by Taiki Chemical Industries Co., Ltd.) was added while cooling the liquid to 1 to 5° C., and stirring was carried out for 16 hours, whereby 367 g of a semi-transparent dark brown dispersion of manganese-doped amorphous-type titanium peroxide of concentration 0.87 wt % was obtained. This was diluted with pure water, thus preparing 375 g of a 0.85 wt % manganese-doped amorphous-type titanium peroxide dispersion.

Working Example 1-5

Iron-Doped Amorphous Type 0.712 g of $FeCl_3.6H_2O$ was completely dissolved in 500 ml of pure water, 10 g of a 50% titanium tetrachloride solution (made by Sumitomo Sitix) was further added to the solution, and pure water was added to make up to 1000 ml, whereby a solution was prepared. Ammonia water obtained by diluting 25% ammonia water (made by Takasugi Pharmaceutical Co., Ltd.) by a factor of 10 was instilled into the solution to adjust the pH to 7.0, whereby a mixture of iron hydroxide and titanium hydroxide was precipitated. The precipitate was continually washed with pure water until the conductivity of the supernatant was not more than 0.8 mS/m; the washing was stopped when the conductivity had become 0.744 mS/m, whereupon 420 g of a liquid containing 0.47 wt % of the hydroxide was produced.

Next, 25 g of 35% hydrogen peroxide (made by Taiki Chemical Industries Co., Ltd.) was added while cooling the liquid to 1 to 5° C., and stirring was carried out for 16 hours, whereby 440 g of a transparent dark yellow/brown dispersion of iron-doped amorphous-type titanium peroxide of concentration 0.44 wt % was obtained. This was concentrated using an ultrafiltration concentrator, thus preparing 220 g of the dispersion with the concentration adjusted to 0.85 wt %.

Working Example 1-6

Zinc-Doped Amorphous Type 0.359 g of $ZnCl_2$ (zinc chloride) was completely dissolved in 500 g of pure water, 10 g of a 50% titanium tetrachloride solution (made by Sumitomo Sitix) was further added to the solution, and pure water was added to make up to 1000 g, whereby a solution was prepared. Ammonia water obtained by diluting 25% ammonia water (made by Takasugi Pharmaceutical Co., Ltd.) by a factor of 10 was instilled into the solution to adjust the pH to 7.0, whereby a mixture of zinc hydroxide and titanium hydroxide was precipitated. The precipitate was continually washed with pure water until the conductivity of the supernatant was not more than 0.8 mS/m; the washing was stopped when the conductivity had become 0.713 mS/m, whereupon 409 g of 0.48 wt % of the hydroxide was produced.

Next, 25 g of 35% hydrogen peroxide aqueous solution (made by Taiki Chemical Industries Co., Ltd.) was added while cooling to 1 to 5° C., and stirring was carried out for 16 hours, whereby 430 g of a transparent yellow/brown zinc-doped amorphous-type titanium peroxide aqueous solution was obtained.

Moreover, 100 g of the zinc-doped amorphous-type titanium peroxide aqueous solution produced as above was weighed out, and was heated for 5 hours at 100° C., whereupon 48 g of a pale yellow zinc-doped anatase-type titanium peroxide sol with a concentration of 0.96 wt % was obtained.

Working Examples 1'-1 to 1'-5

The metal-doped amorphous-type titanium peroxide dispersions prepared in working examples 1-1 to 1-5 were heated for 5 hours at 100° C., thus producing corresponding anatase-type titanium peroxide dispersions, which were taken as working examples to 1'-5.

Working Examples 2

Application onto Polycarbonate Resin Plates

In these 'working examples 2', the working examples 1-1 to 1-5 prepared in 'working examples 1' above were applied onto polycarbonate resin plates, and the evaluation test described below was carried out.

That is, a 6 mm-thick 70 mm×150 mm commercially sold polycarbonate resin plate (made by Teijin Chemicals Ltd.) was prepared, soiling on the surface thereof was removed with alcohol, and the aqueous liquid of one of working examples 1-1 to 1-5 was sprayed onto this substrate with an application amount of 0.4 g/100 cm$^2$. After the application, the surface was dried, and then heating was carried out for 15 minutes at 120° C. using a constant-temperature dryer. Structures of working examples 2-1 to 2-5 were thus manufactured. These structures were taken as sample substrates 1 to 5. Moreover, for comparison, a 6 mm-thick 70 mm×150 mm commercially sold polycarbonate resin plate (made by Teijin Chemicals Ltd.) having no coating formed thereon was prepared, and this was taken as comparative substrate 1.

[Evaluation Test 1]

Sample substrates 1 to 5 and comparative substrate 1 were each put into a Sunshine Weathermeter accelerated weathering test apparatus using an arc carbon lamp, and the state of yellowing of the resin and degradation of the substrate surface through visible light including ultraviolet radiation was measured. The testing time was made to be 1000 hours, 2000 hours or 3000 hours.

(Evaluation Method and Evaluation Criteria)

The evaluation was carried out by eye. Observation and evaluation were carried out based on the following evaluation criteria.

+++: Severe yellowing
++: Considerable yellowing
+: Slight yellowing
−: Hardly any yellowing (Test Results)

The results of 'evaluation test 1' are as shown in Table 1.

As is clear from Table 1, it was found that the weather resistance to degradation (yellowing) of the resin through electromagnetic radiation including ultraviolet radiation for the polycarbonate resin (organic polymer resin) plates dropped in the order sample substrates 1 and 4>sample substrates 3 and 5>sample substrate 2. On the other hand, it was found that comparative substrate 1, on which a coating film of an aqueous liquid containing a titania-metal composite according to the present invention was not formed, had much lower weather resistance than sample substrates 1 to 5.

Moreover, a similar evaluation test was carried out on substrates manufactured using each of the metal-doped anatase-type rather than amorphous-type titanium peroxide dispersions, whereupon similar results were obtained, with no photocatalytic function being exhibited.

TABLE 1

| | Sample sub-strate 1 | Sample sub-strate 2 | Sample sub-strate 3 | Sample sub-strate 4 | Sample sub-strate 5 | Comparative substrate 1 |
| --- | --- | --- | --- | --- | --- | --- |
| 1,000 hours | − | − | − | − | − | ++ |
| 2,000 hours | − | + | − | − | − | +++ |
| 3,000 hours | − | + | + | − | + | +++ |

Working Examples 3

Application onto Tiles

In these 'working examples 3', the working examples 1-1 to 1-5 prepared in 'working examples 1' above were applied onto white interior decoration tiles, and the evaluation test described below was carried out.

That is, a 4 mm-thick 97 mm×97 mm white interior decoration tile (made by Danto Corporation) was prepared, organic matter on the surface was removed by calcining at 500° C. in advance, and then the aqueous liquid of one of working examples 1-1 to 1-5 containing amorphous-type titanium peroxide was sprayed onto the tile with an application amount of 0.4 g/100 cm$^2$. After the application, drying was carried out by heating for 15 minutes at 80° C., and then an organic dye aqueous solution obtained by diluting a commercially sold red ink (made by Pilot) by a factor of 20 with pure water was applied uniformly onto each tile with an application amount of 0.2 g/100 cm$^2$, and drying was carried out at ambient temperature. Structures of working examples 3-1 to 3-5 were thus manufactured. These structures were taken as sample substrates 6 to 10. Moreover, for comparison, the same tile as for working examples 3 was prepared, this tile was calcined at 500° C. to remove organic matter on the surface, and the organic dye aqueous solution was applied on and drying was carried out at ambient temperature as for working examples 3; this was taken as comparative substrate 2.

Working Examples 3'

The same white interior decoration tiles as for working examples 3 were prepared, and processing was carried out as for working examples 3, except that the aqueous liquids applied on were made to be the aqueous liquids of working examples 1'-1 to 1'-5 containing anatase-type titanium peroxide. Structures of working examples 3'-1 to 3'-5 were thus manufactured. These structures were taken as sample substrates 6' to 10'.

Moreover, for comparison, a comparative substrate 2' as in the case of working examples 3 was prepared. This was prepared as for working examples 3', except that an aqueous liquid containing anatase-type titanium peroxide not doped with a metal was used.

[Evaluation Test 2]

Sample substrates 6 to 10 and comparative substrate 2, and sample substrates 6' to 10' and comparative substrate 2' were each placed under a 15 W black light (made by National) with a 10 cm gap and irradiated for 155 hours, thus carrying out a fading evaluation using ultraviolet radiation (400 nm or less) (ultraviolet radiation intensity 360 nm, 1200 μm/cm$^2$).

Furthermore, for sample substrates 6 and 7 and comparative substrate 2, a similar evaluation was carried out, irradiating with direct sunlight for 5 hours in Kyushu.

(Evaluation Method and Evaluation Results)

Fading of the organic dye was evaluated using a colorimeter (Minolta CR-200). For the evaluation, the color difference between before and after the irradiation was measured, the color persistence of each substrate was measured, and bar charts were produced. The measurement results are shown in FIG. 5 for sample substrates 6 to 10 and comparative substrate 2.

According to these results, it was found that the color persistence drops in the order sample substrate 6>sample substrate 10>sample substrate 9>sample substrate 7>sample substrate 8. Furthermore, it was found that the test results also showed a similar trend under sunlight.

Moreover, the measurement results are shown in FIG. 6 for sample substrates 6' to 10' and comparative substrate 2'. According to these results, it can be seen that in the case of using aqueous liquids containing anatase-type titanium peroxide, a similar trend to the case of using amorphous-type aqueous liquids is shown, but the degradation prevention performance is better.

Working Examples 4

Application onto White Tiles in Layers

In these 'working examples 4', the working examples 1-1 to 1-5 prepared in 'working examples 1' above were applied onto white interior decoration tiles in layers, and the evaluation test described below was carried out.

Working Example 4-1

A 4 mm-thick 97 mm×97 mm white interior decoration tile (made by Danto Corporation) was prepared, organic matter on the surface was removed by calcining at 500° C. in advance, and then a first layer of the aqueous liquid of working example 1-1 with an application amount of 0.2 g/100 cm$^2$, and a second layer of the aqueous liquid of working example 1-2 with an application amount of 0.2 g/100 cm$^2$ were sprayed onto the tile. After the application, drying was carried out at ambient temperature, and then an organic dye aqueous solution obtained by diluting a commercially sold red ink (made by Pilot) by a factor of 20 with pure water was applied on uniformly with an application amount of 0.2 g/100 cm$^2$, and drying was carried out at ambient temperature, thus manufacturing a structure of working example 4-1. This was taken as sample substrate 11.

Working Example 4-2

The aqueous liquids for the first layer and the second layer of the structure of working example 4-1, i.e. sample substrate 11, were applied on in the reverse order, and then the organic dye aqueous solution was applied on uniformly and drying was carried out at ambient temperature as for working example 4-1, thus manufacturing a structure of working example 4-2. This was taken as sample substrate 12.

Working Example 4-3

Using the same tile and manufacturing procedure as for working example 4-1, 50 g of the aqueous liquid of working example 1-1 and 50 g of the aqueous liquid of working example 1-4 were mixed together, and the mixture was sprayed onto the tile with an application amount of 0.4 g/100 cm$^2$. After the application, drying was carried out at ambient temperature, and then the organic dye aqueous solution was applied on as for working example 4-1, thus manufacturing a structure of working example 4-3. This was taken as sample substrate 13.

Working Example 4-4

Using the same tile and manufacturing procedure as for working example 4-1, 10% of the same organic dye aqueous solution as for working example 4-1 was mixed into 100 g of an aqueous liquid obtained by mixing 50 g of the aqueous liquid of working example 1-1 and 50 g of the aqueous liquid of working example 1-4 together, the mixture was applied on with an application amount of 0.4 g/100 cm$^2$, and drying was carried out at ambient temperature, thus manufacturing a structure of working example 4-4. This was taken as sample substrate 14.

Working Example 4-5

Using the same tile and manufacturing procedure as for working example 4-1, 10% of the same organic dye aqueous solution as for working example 4-1 was mixed into 50 g of the aqueous liquid of working example 1-1 the mixture was applied on with an application amount of 0.4 g/100 cm$^2$, and drying was carried out at ambient temperature, thus manufacturing a structure of working example 4-5. This was taken as sample substrate 15.

Working Example 4-6

Using the same manufacturing method as for working example 4-5 but with the aqueous liquid of working example 1-4, a structure of working example 4-6 was manufactured. This was taken as sample substrate 16.

(Comparative Substrate 3)

The same tile as for working example 4-1 was prepared, this tile was calcined at 500° C. to remove organic matter on the surface, the organic dye aqueous solution was applied on with an application amount of 2 g/100 cm$^2$, and drying was carried out at ambient temperature, thus obtaining comparative substrate 3.

[Evaluation Test 3]

Sample substrates 11 to 16 and comparative substrate 3 were each placed under a 15 W black light (made by National) with a 10 cm gap and irradiated for 155 hours, thus carrying out a fading evaluation using ultraviolet radiation (400 nm or less) (ultraviolet radiation intensity 360 nm, 1200 μm/cm$^2$).

(Evaluation Method and Evaluation Results)

Fading of the organic dye was evaluated using a colorimeter (Minolta CR-200). As the evaluation method, the color difference between before and after the irradiation was measured. The results were as shown in FIG. 7.

According to these results, it was found that with the exception of sample substrate 15, sample substrates 11 to 16 had a lower fading rate of the red color than the comparative substrate, and hence there was a fading prevention effect. Moreover, the order thereof was sample substrate 13>sample substrate 12>sample substrate 11>sample substrate 16>sample substrate 14>comparative substrate 3, and it was found that with the structures of working examples 4, the fading effect of the sample substrates exceeded the double of that of the comparative substrate. Moreover, it was found that there is a similar trend under sunlight.

Working Examples 5

Two types of structure were manufactured as follows.

Working Example 5-1

The same tile as for working examples 3 was prepared, organic matter on the surface was removed by calcining at 500° C. in advance, and then an organic pigment (polyazo pigment PC-IT1070 made by Sumika Color Co., Ltd.) was applied onto the tile with an application amount of 0.2 g/100 cm$^2$ as a first layer and dried, the aqueous liquid of working example 1-4 was applied on with an application amount of 0.2 g/100 cm$^2$ as a second layer and dried, and the aqueous liquid of working example 1-1 was applied on with an application amount of 0.2 g/100 cm$^2$ as a third layer and dried; heating was then carried out for 15 minutes at 100° C., thus manufacturing a structure of working example 5-1, i.e. sample substrate 17.

Working Example 5-2

The same tile as for working examples 3 was prepared, organic matter on the surface was removed by calcining at 500° C. in advance, and then an aqueous liquid obtained by mixing the aqueous liquid of working example 1-1 and the aqueous liquid of working example 1-4 together in a ratio of 1:1 was applied onto the tile with an application amount of 0.2 g/100 cm$^2$ as a first layer and dried, and an organic pigment (polyazo pigment PC-IT1070 made by Sumika Color Co., Ltd.) was applied onto the tile with an application amount of 0.2 g/100 cm$^2$ as a second layer and dried; heating was then carried out for 15 minutes at 100° C., thus manufacturing a structure of working example 5-2, i.e. sample substrate 18.

[Evaluation Test 4]
(Evaluation Method and Evaluation Results)

In this evaluation test using the organic pigment, evaluation was carried out as for evaluation test 3, whereupon a similar performance to in the case of using the organic dye was obtained.

Working Examples 6

An anatase-type titanium peroxide aqueous dispersion (B50 made by Sustainable Titania Technology Inc.) was sprayed with an application amount of 0.4 g/100 cm$^2$ onto each of sample substrates 1 to 5 and comparative substrate 1 manufactured in evaluation test 1. After the application, drying was carried out by heating for 15 minutes at 150° C., thus manufacturing structures 6-1 to 6-5 of working examples 6, and comparative substrate 4. The structures 6-1 to 6-5 were taken as sample substrates 17 to 21.

[Evaluation Test 5]
(Evaluation Method)

In this evaluation test, evaluation was carried out as for evaluation test 1.

(Evaluation Criteria)

If the photocatalytic function has a direct effect on the resin substrate surface, then peeling or clouding of the substrate surface will occur through oxidative decomposition; an evaluation was thus carried out by eye of such changes (a blocking effect).

+++: Clouding and peeling observed
++: Severe clouding
+: Slight clouding
−: No changes (Evaluation Results)

The results regarding the effect of blocking the photocatalytic function on the resin substrate surface are shown in Table 2. According to these results, it was found that the blocking effect drops in the order sample substrates 17 and 20>sample substrate 21>sample substrates 18 and 19. With comparative substrate 4 in which the anatase-type titanium oxide coating film was formed directly on the resin substrate, there was no blocking performance at all.

TABLE 2

| | Sample substrate 17 | Sample substrate 18 | Sample substrate 19 | Sample substrate 20 | Sample substrate 21 | Comparative substrate 4 |
|---|---|---|---|---|---|---|
| 1,000 hours | − | − | − | − | − | +++ |
| 2,000 hours | − | + | + | − | − | +++ |
| 3,000 hours | − | + | + | − | + | +++ |

Working Examples 7

Film-Forming Solutions, Anti-Soiling Evaluation Test

These 'working examples 7' relate to the third invention described earlier; film-forming solutions prepared by adding a polyether-modified silicone as an additive to each of working examples 1-1 to 1-6 prepared in 'working examples 1' were applied onto glass plates and polycarbonate resin plates, and the evaluation test described below was carried out.

(Film-Forming Solution Manufacturing Example 1)

0.4 wt % of a polyether-modified silicone (SH3746 made by Dow Corning Toray Silicone Co., Ltd.) was added to the 0.85 wt % copper-doped amorphous-type titanium peroxide aqueous dispersion manufactured in working example 1-1 and the mixture was stirred thoroughly; this was taken as film-forming solution manufacturing example 1.

(Film-Forming Solution Manufacturing Examples 2 to 6)

0.4 wt % of the polyether-modified silicone (SH3746 made by Dow Corning Toray Silicone Co., Ltd.) was similarly added to each of the metal-doped amorphous-type titanium peroxide aqueous liquids manufactured in working examples 1-2 to 1-6 and in each case the mixture was stirred thoroughly to obtain a film-forming solution; these examples were taken respectively as film-forming solution manufacturing examples 2 to 6.

Each of the solutions of film-forming solution manufacturing examples 1 to 6 was then brushed twice (estimated film thickness 0.08 μm) onto a 4 mm-thick 100 mm×100 mm transparent float glass plate and a 4 mm-thick 70 mm×150 mm transparent polycarbonate plate, and drying was carried out at ambient temperature. The six glass plates and six polycarbonate plates were then dried by heating for 15 minutes at 80° C. using a constant-temperature constant-humidity unit, and the glass plates were taken as sample substrates 22 to 27 and the polycarbonate plates as sample substrates 28 to 33.

Moreover, plates on which a film of an anatase-type titanium peroxide dispersion not doped with a metal was similarly formed were taken as comparative substrates 5 and 6. With comparative substrate 6, however, film-forming solution manufacturing example 1 was brushed on once as a photocatalytic decomposition blocking primer layer.

[Evaluation Test 6] Anti-Soiling Function Evaluation Test 1
(Evaluation Method)

One drop of a commercially sold salad oil (made by Nissin Seiyu) was dropped in three places onto each of sample substrates 22 to 33, and the sample substrates were exposed outdoors in Saga Prefecture, Kyushu for one month from early July to early August.

(Evaluation Criteria)

The number of days until the salad oil marks on each substrate could no longer be seen was determined by eye. To determine whether or not there was a mark, tap water was sprinkled on, and if the surface was hydrophilic then the salad oil was taken to have been eliminated.

(Evaluation Results)

The results for the number of days until the hydrophobicity due to the salad oil disappeared for each of the sample substrates were as shown in Table 3.

TABLE 3

| Sample substrate | No. 22 > | No. 23 > No. 27 > No. 24 > | Comparative substrate 5 > | No. 25 > No. 26 |
|---|---|---|---|---|
| No. days until eliminated | 10 days | → | 14 days | → 28 days |

The same evaluation was carried out for sample substrates 28 to 33 and comparative substrate 6; a similar trend was shown.

Intrinsically, each of the metal-doped titania films does not have a photocatalytic performance, but rather only comparative substrates 5 and 6 have a photocatalytic performance; however, it was found that removal of organic material beyond that through photocatalytic decomposition was observed, and hence the metal-doped titanias do have an anti-soiling performance.

Moreover, even upon leaving the polycarbonate plate of comparative substrate 6 for two months, the substrate remained transparent with no chalking. It was thus found that film-forming solution manufacturing example 1 has a function of blocking the photocatalytic decomposition function.

Working Examples 8

Anti-Soiling Function Evaluation Test 2

A commercially sold 450 mm×600 mm×2 mm polypropylene craft sheet (foam type, red: chorine-free) was prepared as a film-forming sample substrate, and was divided into three as shown in FIG. 8 to give sections A, B and C.

Section A film formation: The solution manufactured in film-forming solution manufacturing example 1 was spray-coated on to form a 0.16 g/100 cm$^2$ film, and drying was carried out at ambient temperature.

Section B film formation: A film was formed as for section A using the solution manufactured in film-forming solution manufacturing example 1, and taking this as a first layer, a second layer of a 0.2 g/100 cm$^2$ film was then formed by spraying on an anatase-type titanium peroxide (B50 made by Sustainable Titania Technology Inc.) aqueous dispersion, and drying was carried out at ambient temperature.

Section C (control): No film was formed.

Films were formed as above by spraying, drying was carried out at ambient temperature, outdoor exposure was commenced, and the anti-soiling performance was evaluated after 1 month and after 2 months.

(Evaluation Method)

As an evaluation of the performance against soiling through rain due to air pollution, the color difference values were evaluated using a Minolta colorimeter (CR-300). The results were as shown in Tables 4 to 6.

TABLE 4

Color data at beginning: Jun. 6, 2003

| Section | | L* | a* | b* | Average color ΔL | Δa | Δb |
|---|---|---|---|---|---|---|---|
| A | 1st time | 44.35 | 50.34 | 30.27 | 44.43 | 50.23 | 30.15 |
| | 2nd time | 44.39 | 50.28 | 30.25 | | | |
| | 3rd time | 44.55 | 50.08 | 29.93 | | | |
| B | 1st time | 48.69 | 43.11 | 21.13 | 48.69 | 43.17 | 21.14 |
| | 2nd time | 48.70 | 43.19 | 21.20 | | | |
| | 3rd time | 48.67 | 43.22 | 21.09 | | | |
| C | 1st time | 45.58 | 48.51 | 28.46 | 45.65 | 48.51 | 28.39 |
| | 2nd time | 45.66 | 48.50 | 28.36 | | | |
| | 3rd time | 45.70 | 48.51 | 28.34 | | | |

TABLE 5

Color data after 1 month: Jul. 6, 2003

| Section | | L* | a* | b* | Average color ΔL | Δa | Δb |
|---|---|---|---|---|---|---|---|
| A | 1st time | 45.02 | 48.17 | 28.22 | 45.16 | 48.02 | 27.97 |
| | 2nd time | 45.26 | 48.01 | 27.86 | | | |
| | 3rd time | 45.19 | 47.87 | 27.84 | | | |
| B | 1st time | 48.68 | 42.73 | 21.31 | 48.53 | 42.89 | 21.48 |
| | 2nd time | 48.46 | 42.91 | 21.55 | | | |
| | 3rd time | 48.46 | 43.02 | 21.57 | | | |
| C | 1st time | 44.36 | 45.57 | 27.18 | 44.33 | 45.46 | 27.02 |
| | 2nd time | 44.21 | 45.25 | 26.87 | | | |
| | 3rd time | 44.43 | 45.55 | 27.00 | | | |

TABLE 6

Color data after 2 months: Aug. 11, 2003

| Section | | L* | a* | b* | ΔL | Δa | Δb |
|---|---|---|---|---|---|---|---|
| A | 1st time | 45.75 | 47.11 | 26.18 | 45.78 | 47.04 | 26.11 |
|   | 2nd time | 45.82 | 47.01 | 26.07 | | | |
|   | 3rd time | 45.78 | 47.01 | 26.08 | | | |
| B | 1st time | 48.67 | 43.12 | 21.06 | 48.35 | 43.44 | 21.39 |
|   | 2nd time | 48.38 | 43.46 | 21.39 | | | |
|   | 3rd time | 47.99 | 43.75 | 21.73 | | | |
| C | 1st time | 43.54 | 44.38 | 26.19 | 43.61 | 44.52 | 26.22 |
|   | 2nd time | 43.62 | 44.62 | 26.22 | | | |
|   | 3rd time | 43.66 | 44.55 | 26.29 | | | |

(Evaluation Results)

AL after two months for section A exhibited the closest value to AL for section C on which no film was formed (the control) immediately after commencement. This means that section A best maintained the original base color. Moreover, regarding the redness value Δa of section C of the red substrate immediately after commencement, Δa of section A after two months exhibited the closest value to the value immediately after commencement, and hence section A best maintained the original base color.

It was thus found that for section A, the state before commencement of the evaluation of the sample substrates was best maintained, and hence the anti-soiling performance worked effectively. Moreover, for section B, chalking due to a photocatalytic function did not occur. For section B, it was found that film-forming solution manufacturing example 1 of the first layer blocks the photocatalytic decomposition function.

INDUSTRIAL APPLICABILITY

A titania-metal composite according to the present invention is characterized in that at least one out of copper, manganese, nickel, cobalt, iron, zinc, and compounds thereof coexists with titanium oxide fine particles having peroxy groups; in the case that an aqueous liquid or dispersion containing such a titania-metal composite is used with an organic material such as a resin or an organic dye, performance degradation such as discoloration or fading caused by energy that dissociates molecular bonds in organic compounds from ultraviolet radiation or visible light from sunlight, an electromagnetic radiation generator or the like can be prevented.

In particular, by using this aqueous liquid or dispersion alone to form a coating film adjacent to a coating film of an organic dye or pigment, or using this aqueous liquid or dispersion to form a coating film together with an organic dye or pigment, a drop in decorativeness of color due to fading or discoloration of a coating material, a printed article, a building material, a fiber, an organic polymer resin product or the like can be avoided.

Furthermore, because such an aqueous liquid or dispersion containing a titania-metal composite according to the present invention contains titania having peroxy groups, a film thereof can be formed on any of various substrates, regardless of whether organic or inorganic; in the case of using with a substrate having a substrate property such as hydrophobicity or water-repellency, i.e. an incompatibility with the properties of water, by adding an alcohol, a surfactant, or a coating material leveling agent to the dispersion, film formation becomes easy, and moreover a surface performance with anti-soiling, anti-microbial anti-algal anti-rusting and hydrophilic functions can be obtained.

The invention claimed is:

1. A substrate comprising an inorganic material, characterized by having a coating film formed on a surface thereof using a titania-metal composite dispersion not having a photocatalytic activity, the dispersion comprising a mixture of titanium oxide fine particles doped only with elemental particles, wherein the elemental particles are formed from an element selected from the group consisting of copper, manganese, nickel, cobalt, iron, and zinc.

2. A substrate comprising an organic material, characterized by having a coating film formed on a surface thereof using a titania-metal composite dispersion not having a photocatalytic activity, the dispersion comprising a mixture of titanium oxide fine particles doped only with elemental particles, wherein the elemental particles are formed from an element selected from the group consisting of copper, manganese, nickel, cobalt, iron, and zinc.

3. A film formation method using a titania-metal composite dispersion not having a photocatalytic activity, characterized by forming an intermediate film comprising at least one out of silicones, silicone oils and silane compounds between a coating film formed using the titania-metal composite dispersion not having a photocatalytic activity, the dispersion comprising a mixture of titanium oxide fine particles doped only with elemental particles, wherein the elemental particles are formed from an element selected from the group consisting of copper, manganese, nickel, cobalt, iron, and zinc.

* * * * *